(12) United States Patent
Phillips et al.

(10) Patent No.: US 7,988,588 B2
(45) Date of Patent: Aug. 2, 2011

(54) MULTI-SPEED TRANSMISSION

(75) Inventors: Andrew W. Phillips, Saline, MI (US);
Scott H. Wittkopp, Ypsilanti, MI (US);
James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 838 days.

(21) Appl. No.: 11/937,070

(22) Filed: Nov. 8, 2007

(65) Prior Publication Data

US 2008/0287248 A1 Nov. 20, 2008

Related U.S. Application Data

(60) Provisional application No. 60/868,423, filed on Dec. 4, 2006.

(51) Int. Cl.
*F16H 3/44* (2006.01)
(52) U.S. Cl. ..................................... 475/284
(58) Field of Classification Search .................. 475/284
See application file for complete search history.

(56) References Cited

U.S. PATENT DOCUMENTS

| | | | |
|---|---|---|---|
| 6,558,287 B2 | 5/2003 | Hayabuchi | |
| 6,634,981 B1 | 10/2003 | Raghavan | |
| 6,648,790 B2 | 11/2003 | Raghavan | |
| 6,659,903 B1 | 12/2003 | Bucknor | |
| 6,659,904 B1 | 12/2003 | Usoro | |
| 6,709,360 B2 | 3/2004 | Raghavan | |
| 6,887,178 B2 | 5/2005 | Miyazaki | |
| 6,910,985 B2 | 6/2005 | Ishimaru | |
| 6,949,048 B2 | 9/2005 | Bucknor | |
| 6,962,548 B2 | 11/2005 | Bucknor | |
| 7,014,590 B2 | 3/2006 | Stevenson | |
| 7,029,416 B2 | 4/2006 | Miyazaki | |
| 7,033,299 B2 | 4/2006 | Bucknor | |
| 7,059,995 B2 | 6/2006 | Stevenson | |
| 7,074,153 B2 | 7/2006 | Usoro | |
| 7,081,066 B2 | 7/2006 | Raghavan | |
| 7,094,173 B2 | 8/2006 | Raghavan | |
| 7,101,303 B2 | 9/2006 | Tiesler | |
| 7,101,305 B2 | 9/2006 | Tabata | |
| 7,104,915 B2 | 9/2006 | Tiesler | |
| 7,115,061 B2 | 10/2006 | Tiesler | |
| 7,115,063 B2 | 10/2006 | Tiesler | |
| 7,118,509 B2 | 10/2006 | Tabata | |
| 7,118,510 B2 | 10/2006 | Raghavan | |
| 7,118,511 B2 | 10/2006 | Tiesler | |
| 7,137,923 B2 | 11/2006 | Tiesler | |
| 7,150,695 B2 | 12/2006 | Usoro | |
| 7,150,696 B2 | 12/2006 | Bucknor | |
| 7,156,767 B2 | 1/2007 | Tiesler | |
| 7,156,768 B2 | 1/2007 | Gumpoltsberger | |
| 7,722,496 B2* | 5/2010 | Phillips et al. | 475/276 |
| 7,731,621 B2* | 6/2010 | Wittkopp et al. | 475/275 |
| 2004/0053729 A1* | 3/2004 | Raghavan et al. | 475/275 |
| 2005/0227805 A1* | 10/2005 | Usoro et al. | 475/275 |
| 2005/0282680 A1 | 12/2005 | Soh | |
| 2006/0068965 A1 | 3/2006 | Gumpoltsberger | |
| 2007/0010367 A1 | 1/2007 | Raghavan et al. | |
| 2007/0010369 A1 | 1/2007 | Bucknor | |
| 2007/0010370 A1 | 1/2007 | Raghavan | |
| 2008/0242479 A1* | 10/2008 | Hart et al. | 475/276 |

* cited by examiner

*Primary Examiner* — David D Le
*Assistant Examiner* — Erin D Bishop

(57) ABSTRACT

A transmission is provided having an input member, an output member, three planetary gear sets, a plurality of coupling members and a plurality of torque transmitting devices. Each of the planetary gear sets includes first, second and third members. The torque transmitting devices may include clutches and brakes.

3 Claims, 2 Drawing Sheets

| GEAR STATE | GEAR RATIO | TORQUE TRANSMTTING DEVICES | | | | | |
|---|---|---|---|---|---|---|---|
| | | 72 | 64 | 68 | 70 | 66 | 62 |
| REV 2 | | X | | X | | X | |
| REV 1 | -5.228 | X | | | X | X | |
| N | | | | | | | |
| 1ST | 5.036 | X | X | X | | | |
| 2ND | 3.075 | X | X | | X | | |
| 3RD | 1.946 | | X | X | X | | |
| 4TH | 1.600 | | X | | X | X | |
| 5TH | 1.242 | | X | | X | | X |
| 6TH | 1.000 | | X | | | X | X |
| 7TH | 0.897 | | | | X | X | X |
| 8TH | 0.766 | | | X | X | | X |

X = ON, CARRYING TORQUE

FIG. 3

MULTI-SPEED TRANSMISSION

CROSS-REFERENCE TO RELATED APPLICATIONS

This application claims the benefit of U.S. Provisional Application No. 60/868,423, filed on Dec. 4, 2006. The disclosure of the above application is incorporated herein by reference.

FIELD

The invention relates generally to a multiple speed transmission having a plurality of planetary gear sets and a plurality of torque transmitting devices and more particularly to a transmission having eight or more speeds, three planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, three planetary gear sets, a plurality of coupling members and a plurality of torque transmitting devices. Each of the planetary gear sets includes first, second and third members. The torque transmitting devices are for example clutches and brakes.

An embodiment of the transmission includes an input member, an output member, first, second, and third planetary gear sets each having first, second and third members, wherein the input member is continuously interconnected to the third member of the third planetary gear set and the output member is continuously interconnected to the third member of the second planetary gear set, a first interconnecting member continuously interconnecting the first member of the first planetary gear set with the first member of the second planetary gear set and a second interconnecting member continuously interconnecting the second member of the first planetary gear set with the second member of the second planetary gear set. Six torque transmitting mechanisms are selectively engageable to interconnect one of the first, second, and third members with another of the first, second, third members, and the stationary element. The torque transmitting mechanisms are selectively engageable in combinations of at least three to establish at least eight forward speed ratios and at least one reverse speed ratio between the input member and the output member.

In one aspect of the present invention, a first of the six torque transmitting mechanisms is selectively engageable to interconnect the second member of the second planetary gear set with the third member of the third planetary gear set.

In another aspect of the present invention, a second of the six torque transmitting mechanisms is selectively engageable to interconnect the third member of the first planetary gear set with the second member of the third planetary gear set.

In yet another aspect of the present invention, a third of the six torque transmitting mechanisms is selectively engageable to interconnect the first member of the first planetary gear set with the second member of the third planetary gear set.

In yet another aspect of the present invention, a fourth of the six torque transmitting mechanisms is selectively engageable to interconnect the first member of the first planetary gear set with the first member of the third planetary gear set.

In yet another aspect of the present invention, a fifth of the six torque transmitting mechanisms is selectively engageable to interconnect the first member of the third planetary gear set with the stationary element.

In yet another aspect of the present invention, a sixth of the six torque transmitting mechanisms is selectively engageable to interconnect the second member of the second planetary gear set with the stationary element.

In yet another aspect of the present invention, the first members are sun gears, the second members are carrier members, and the third members are ring gears.

In yet another aspect of the present invention, two of the torque transmitting mechanisms are brakes for connecting the first, second, and third members to the stationary element and four of the torque transmitting mechanisms are clutches for connecting the first, second, and third members to another of the first, second, and third members.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting devices in each of the available forward and reverse speeds or gear ratios of the transmission illustrated in FIGS. 1 and 2.

DETAILED DESCRIPTION

The following description is merely exemplary in nature and is not intended to limit the present disclosure, application, or uses.

At the outset, it should be appreciated that the embodiment of the eight speed automatic transmission of the present invention has an arrangement of permanent mechanical connections between the elements of the three planetary gear sets. More specifically, a first component or element of a first planetary gear set is permanently coupled to a first component or element of a second planetary gear set and a second component or element of the first planetary gear set is permanently coupled to a second component or element of the second planetary gear set.

Figure 1:
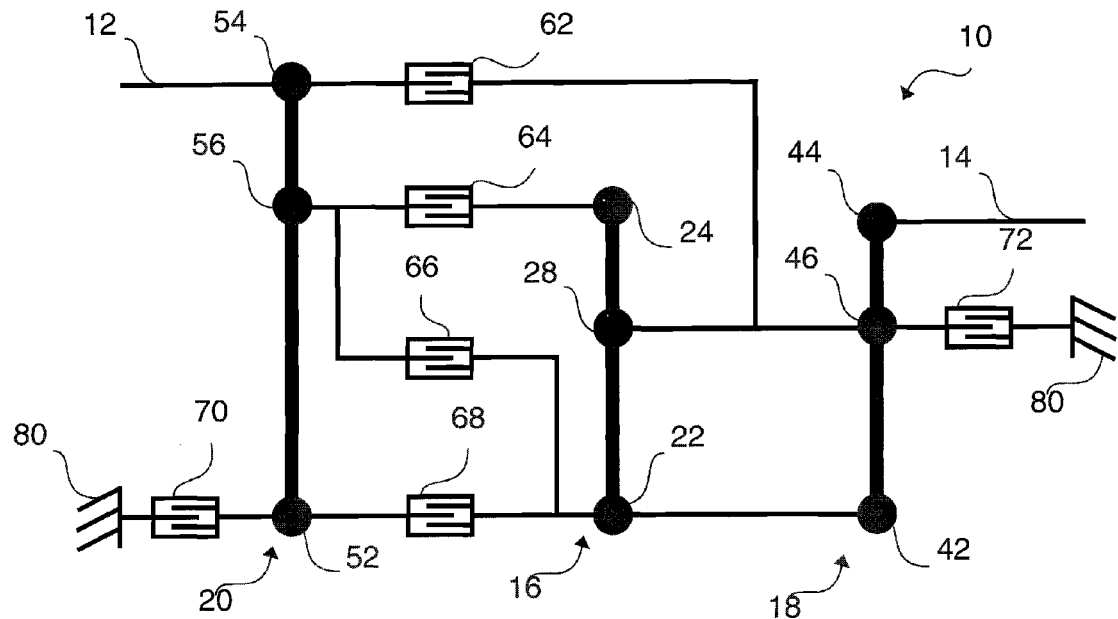
FIG. 1 is a lever diagram of an embodiment of an eight speed transmission according to the present invention.

Referring now to FIG. 1, an embodiment of an eight speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratio and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, an output shaft or member 14, a first planetary gear set 16 having three nodes: a first node 22, a second node 24 and a third node 28, a second planetary gear set 18 having three nodes: a first node 42, a second node 44 and a third node 46, and a third planetary gear set 20 having three nodes: a first node 52, a second node 54 and a third node 56.

The input member 12 is coupled to the second node 54 of the third planetary gear set 20. The output member 14 is coupled to the second node 44 of the second planetary gear set 18. The first node 22 of the first planetary gear set 16 is coupled to the first node 42 of the second planetary gear set 18. The third node 28 of the first planetary gear set 16 is coupled to the third node 46 of the second planetary gear set 18.

A first clutch 62 selectively connects the second node 54 of the third planetary gear set 20 to the third node 46 of the second planetary gear set 18 and the third node 28 of the first planetary gear set 16. A second clutch 64 selectively connects the third node 56 of the third planetary gear set 20 to the second node 24 of the first planetary gear set 16. A third clutch 66 selectively connects the third node 56 of the third planetary gear set 20 to the first node 22 of the first planetary gear set 16. A fourth clutch 68 selectively connects the first node 52 of the third planetary gear set 20 to the first node 22 of the first planetary gear set 16. A first brake 70 selectively connects the first node 52 of the third planetary gear set 20 to the ground or a transmission housing 80. A second brake 72 selectively connects the third node 46 of the second planetary gear set 18 to the ground or the transmission housing 80.

Figure 2:
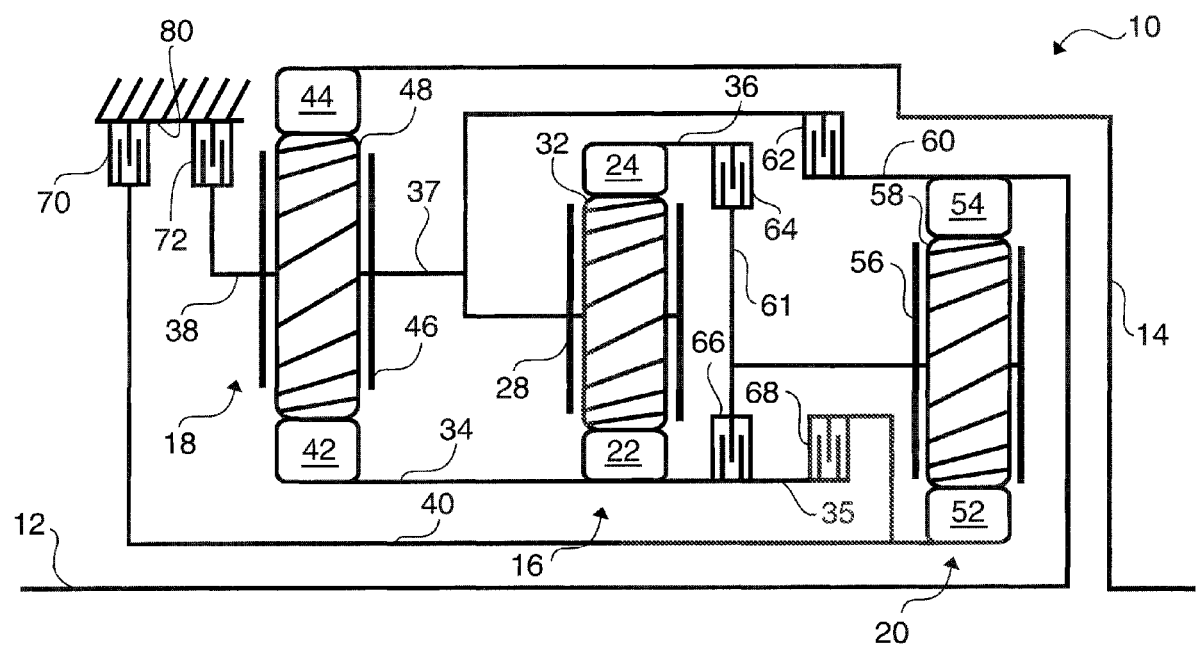
FIG. 2 is a diagrammatic view of an embodiment of an eight speed transmission according to the present invention.

Referring now to FIG. 2, a stick diagram presents a schematic layout of the embodiment of the eight speed transmission 10 according to the present invention. In FIG. 2, the numbering from the lever diagram of FIG. 1 is carried over. The clutches, brakes and couplings are correspondingly presented whereas the nodes of the planetary gear sets now appear as components of planetary gear sets such as sun gears, ring gears, planet gears and planet gear carriers.

For example, the first planetary gear set 16 includes a sun gear member 22, a ring gear member 24 and a carrier member 28 that rotatably supports a set of pinion gears 32. The pinion gears 32 are configured to intermesh with the sun gear member 22 and the ring gear member 24. The sun gear member 22 is connected for common rotation with a first interconnecting shaft or member 34 and a second interconnecting shaft or member 35. The ring gear member 24 is connected for common rotation with a third interconnecting shaft or member 36. The carrier member 28 is connected for common rotation with a fourth interconnecting shaft or member 37.

The second planetary gear set 18 includes a sun gear member 42, a ring gear member 44 and a carrier member 46 that rotatably supports a set of pinion gears 48. The pinion gears 48 are configured to intermesh with both the sun gear member 42 and the ring gear member 44. The sun gear member 42 is connected for common rotation with the first interconnecting member 34. The ring gear member 44 is connected for common rotation with the output member 14. The carrier member 46 is connected for common rotation with the fourth interconnecting member 37 and a fifth interconnecting shaft or member 38.

The third planetary gear set 20 includes a sun gear member 52, a ring gear member 54 and a carrier member 56 that rotatably supports a set of pinion gears 58. The pinion gears 58 are configured to intermesh with both the sun gear member 52 and the ring gear member 54. The sun gear member 52 is connected for common rotation with a sixth interconnecting shaft or member 40. The ring gear member 54 is connected for common rotation with the input member 12 and a seventh interconnecting shaft or member 60. The carrier member 56 is connected for common rotation with an eighth interconnecting shaft or member 61.

The input member 12 is continuously connected to an engine (not shown) or to a turbine of a torque converter (not shown). The output member 14 is continuously connected with a final drive unit or transfer case (not shown).

The torque-transmitting mechanisms or clutches 62, 64, 66, 68 and the brakes 70, 72 allow for selective interconnection of the shafts or interconnecting members, members of the planetary gear sets and the housing. For example, the first clutch 62 is selectively engageable to connect the fourth interconnecting member 37 to the seventh interconnecting member 60. The second clutch 64 is selectively engageable to connect the third interconnecting member 36 to the eighth interconnecting member 61. The third clutch 66 is selectively engageable to connect the second interconnecting member 35 to the eighth interconnecting member 61. The fourth clutch 68 is selectively engageable to connect the sixth interconnecting member 40 to the second interconnecting member 35. The first brake 70 is selectively engageable to connect the sixth interconnecting member 40 to the ground or transmission housing 80 to restrict rotation of the sixth interconnecting member 40 relative to the housing 80. The second brake 72 is selectively engageable to connect the fifth interconnecting member 38 to the ground or transmission housing 80 to restrict rotation of the fifth interconnecting member 38 relative to the housing 80.

Referring now to FIGS. 2 and 3, the operation of the embodiment of the eight speed transmission 10 will be described. It will be appreciated that transmission 10 is capable of transmitting torque from the input shaft or member 12 to the output shaft or member 14 in at least eight forward speed or torque ratios and at least two reverse speed or torque ratios. Each forward and reverse speed or torque ratio is attained by engagement of one or more of the torque-transmitting mechanisms (i.e. first clutch 62, second clutch 64, third clutch 66, fourth clutch 68, first brake 70, and second brake 72), as will be explained below. FIG. 3 is a truth table presenting the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish a first reverse gear, the first brake 70, the second brake 72 and the third clutch 66 are engaged or activated. The first brake 70 connects the sixth interconnecting member 40 to the ground or transmission housing 80 to restrict rotation of the sixth interconnecting member 40 relative to the housing 80. The second brake 72 connects the fifth interconnecting member 38 to the ground or transmission housing 80 to restrict rotation of the fifth interconnecting member 38 relative to the housing 80. The third clutch 66 connects the second interconnecting member 35 to the eighth interconnecting member 61. Likewise, the eight forward ratios are achieved through different combinations of clutch and brake engagement, as shown in FIG. 3.

It will be appreciated that the foregoing explanation of operation and gear states of the eight speed transmission 10 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
    an input member;
    an output member;
    first, second, and third planetary gear sets each having first, second and third members, wherein the input member is continuously interconnected to the third member of the third planetary gear set and the output member is continuously interconnected to the third member of the second planetary gear set;
    a first interconnecting member continuously interconnecting the first member of the first planetary gear set with the first member of the second planetary gear set;
    a second interconnecting member continuously interconnecting the second member of the first planetary gear set with the second member of the second planetary gear set;
    a first torque transmitting mechanism selectively engageable to interconnect the second member of the second planetary gear set with the third member of the third planetary gear set;
    a second torque transmitting mechanism selectively engageable to interconnect the third member of the first planetary gear set with the second member of the third planetary gear set;
    a third torque transmitting mechanism selectively engageable to interconnect the first member of the first planetary gear set with the second member of the third planetary gear set;
    a fourth torque transmitting mechanism selectively engageable to interconnect the first member of the first planetary gear set with the first member of the third planetary gear set;
    a fifth torque transmitting mechanism selectively engageable to interconnect the first member of the third planetary gear set with the stationary element; and
    a sixth torque transmitting mechanism selectively engageable to interconnect the second member of the second planetary gear set with the stationary element,
    wherein the torque transmitting mechanisms are selectively engageable in combinations of at least three to establish at least eight forward speed ratios and at least one reverse speed ratio between the input member and the output member.

2. The transmission of claim 1 wherein the first members are sun gears, the second members are carrier members, and the third members are ring gears.

3. A transmission comprising:
    an input member;
    an output member;
    first, second, and third planetary gear sets each having a sun gear member, a carrier member and a ring gear member, wherein the input member is continuously interconnected to the ring gear member of the third planetary gear set and the output member is continuously interconnected to the ring gear member of the second planetary gear set;
    a first interconnecting member continuously interconnecting the sun gear member of the first planetary gear set with the sun gear member of the second planetary gear set;
    a second interconnecting member continuously interconnecting the carrier member of the first planetary gear set with the carrier member of the second planetary gear set;
    a first torque transmitting mechanism selectively engageable to interconnect the carrier member of the second planetary gear set with the ring gear member of the third planetary gear set;
    a second torque transmitting mechanism selectively engageable to interconnect the ring gear member of the first planetary gear set with the carrier member of the third planetary gear set;
    a third torque transmitting mechanism selectively engageable to interconnect the sun gear member of the first planetary gear set with the carrier member of the third planetary gear set;
    a fourth torque transmitting mechanism selectively engageable to interconnect the sun gear member of the first planetary gear set with the sun gear member of the third planetary gear set;
    a fifth torque transmitting mechanism selectively engageable to interconnect the sun gear member of the third planetary gear set with the stationary element; and
    a sixth torque transmitting mechanism selectively engageable to interconnect the carrier member of the second planetary gear set with the stationary element,
    wherein the torque transmitting mechanisms are selectively engageable in combinations of at least three to establish at least eight forward speed ratios and at least one reverse speed ratio between the input member and the output member.

* * * * *